(12) United States Patent
Ahn et al.

(10) Patent No.: US 10,091,069 B2
(45) Date of Patent: Oct. 2, 2018

(54) METHOD FOR MODELLING INFORMATION TRANSMISSION NETWORK HAVING HIERARCHICAL STRUCTURE AND APPARATUS THEREOF

(71) Applicant: AGENCY FOR DEFENSE DEVELOPMENT, Daejeon (KR)

(72) Inventors: Myung-Kil Ahn, Seoul (KR); Yong-Hyun Kim, Seoul (KR); Byeong-Hee Roh, Suwon-si (KR); Byeong-Uk Lee, Suwon-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 104 days.

(21) Appl. No.: 15/292,306

(22) Filed: Oct. 13, 2016

(65) Prior Publication Data

US 2017/0264499 A1 Sep. 14, 2017

(30) Foreign Application Priority Data

Mar. 9, 2016 (KR) .......... 10-2016-0028288

(51) Int. Cl.
*H04L 12/58* (2006.01)
*H04L 12/24* (2006.01)
*H04L 12/751* (2013.01)

(52) U.S. Cl.
CPC ............ *H04L 41/145* (2013.01); *H04L 41/12* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 2002/0118641 | A1* | 8/2002 | Kobayashi | .......... H04L 12/1489 370/230 |
| 2015/0207727 | A1* | 7/2015 | Roy | ...................... H04L 41/147 398/5 |
| 2016/0080202 | A1* | 3/2016 | Zhang | ..................... H04L 41/12 709/223 |

FOREIGN PATENT DOCUMENTS

| KR | 2010-0070568 A | 6/2010 |
|---|---|---|
| KR | 2016-0006650 A | 1/2016 |

OTHER PUBLICATIONS

Sungsoo Lee et al., "A Study of Routing based on Adjacency Matrix in Ad hoc Networks," Korea Information Processing Society, 15-C vol. 6, p. 531-538, Dec. 2008.

* cited by examiner

*Primary Examiner* — Zewdu A Beyen
(74) *Attorney, Agent, or Firm* — LRK Patent Law Firm

(57) ABSTRACT

A method for modeling an information transmission network having a hierarchical structure, and an apparatus thereof. The apparatus is adapted to model an information transmission network having a hierarchical structure in which information transmission is conducted between pairs of nodes to which pre-defined relationships are assigned, the apparatus including: a connectivity map generating unit for generating connection relationship information for each node, on a basis of traffic information including data transmission direction information for nodes contained in the information transmission network and a connectivity map for the nodes on a basis of the connection relationship information for each node: and a traffic map generating unit for generating a traffic information map accounting for traffic intensities between pairs of the nodes by applying inter-node traffic information to the connectivity map.

12 Claims, 5 Drawing Sheets

METHOD FOR MODELLING INFORMATION TRANSMISSION NETWORK HAVING HIERARCHICAL STRUCTURE AND APPARATUS THEREOF

CROSS REFERENCE TO RELATED APPLICATION

This application claims priority to Korean Patent Application No. 10-2016-0028288, filed Mar. 9, 2016, which is hereby incorporated by reference in its entirety into this application.

BACKGROUND OF THE INVENTION

1. Field of the Invention

The present disclosure relates to a method for modeling an information transmission network having a hierarchical structure, and an apparatus thereof. More particularly, the present disclosure relates to an apparatus and a method for modeling a hierarchical and standardized information transmission network, such as a military tactical communication network, SCADA (Supervisory Control And Data Acquisition), etc.

2. Description of Related Art

A hierarchical and standardized information transmission network, such as a military tactical communication network or a SCADA system, is a communication network (e.g., industrial control system network) that is used with the aim of achieving supervisory control and data acquisition. In a typical communication environment, a full-mesh topology, in which there is a direct link between all pairs of nodes, is employed. In contrast, a hierarchical and standardized information transmission network has nodes arranged in a hierarchy where separate groups exist at each level. Even at the same level, nodes that belong to different groups are restricted from direct communication therebetween, but are allowed to communicate with each other via group(s) at higher levels.

In addition, information transmission in a hierarchical and standardized information transmission network is not conducted between all pairs of nodes, but only between particular pairs of nodes, groups and or levels to which defined logical relationships are assigned. That is, even though nodes are in end-to-end connection, communication between all pairs of nodes may be restricted according to structural or strategic properties.

Hierarchical and standardized information transmission networks are used in application environments of various fields. For example, they are used for special purposes in application environments in which definite relationships between nodes are given, like SCADA systems, military communication networks, and enterprise networks. Generally, such a standardized information transmission network has a hierarchical structure in which information transmission occurs from upper nodes to lower nodes or vice versa.

In such a hierarchical network environment, nodes are classified into groups or systems based on common properties, such as position, purpose, operating system, etc., and information transmission relationships between nodes are mapped into hierarchical structures Such a group or system is a cluster of functions that can be divided into control, report, propagation, sharing. order, management, request, and response functions. These functions have respective properties. The functions of control, order and management are used to transmit traffic from upper-level systems lower-level systems. Conversely, the functions of request and report are used to transmit traffic from lower-level systems to upper-level systems. In addition, the functions of propagation, sharing, etc. enable transmission irrespective of hierarchical level, that is, upper- and lower-level systems. This traffic system plays an important role in modeling traffic in a hierarchical network.

Conventional network modeling and simulation methods take as an end-to-end modeling approach a full-mesh topology in which information can be directly transmitted between all pairs of nodes. However, the conventional network modeling and simulation methods do not take into consideration the traffic and structure of the above-mentioned hierarchical and standardized information transmission network.

There are typical modeling and simulation methods employing standardized information transmission systems. The typical methods apply information transmission between nodes to modeling and simulation systems. In the typical methods, the environment for the modeling and simulation system must be completely reestablished when the network changes in size, when information transmission relationships change together with operation mode and strategy, or when a node is added. That is, because conventional methods are void of the information transmission system modeling that accounts for general situations, and exhibit subordinate relationships in which an information transmission system is applied to the modeling and simulation system itself, even a trivial change in information transmission configuration requires system redesign and verification, consuming increased simulation time and wasting resources. In addition, based on a fixed topology in which account is taken of positions among nodes, groups or systems in which information transmission and hierarchical structures are physically arranged, the typical modeling and simulation methods have difficulty in accounting for the variety of hierarchical topology structures having logical construction relationships.

RELATED ART DOCUMENT

Patent Document

Korean Patent Unexamined Application Publication No. 2016-0006650 (title: Connection relationship search system between network devices using ARP table and FDB table)

SUMMARY OF THE INVENTION

An object of the present disclosure is to provide a method and an apparatus for modeling and simulating an information transmission network having hierarchical and standardized properties (end-to-end connection relationship), such as a military tactical communication network, and SCADA, different from a general full-mesh topology.

Thus, the present disclosure aims to provide a method and an apparatus for modeling and simulating an information transmission network having a hierarchical structure in full consideration of inter-node connection relationships accounting for an information transmission system of the network, and traffic volumes between pairs of nodes.

Another object of the present disclosure is to provide a modeling method by which various topological configurations of information transmission networks having hierarchical structures in logical relationships can be reflected, and an apparatus thereof.

In order to accomplish the above objects, the present disclosure provides a method for modeling an information transmission network having a hierarchical structure in which information transmission is conducted between pairs of nodes to which pre-defined relationships are assigned, the method comprising generating connection relationship information for each node, on a basis of traffic information including data transmission direction information for nodes contained in the information transmission network, generating a connectivity map for the nodes on a basis of the connection relationship information for each node; and generating a traffic information map accounting for traffic intensities between pairs of the nodes by applying inter-node traffic information to the connectivity map.

In some embodiments of the present disclosure, the traffic information map may be composed of an adjacency matrix based on a number of the nodes.

In some embodiments of the present disclosure, the nodes contained in the information transmission network may be discriminated by respective identifier information, and the generating step of the traffic information map includes setting traffic information map elements contained in the traffic information map according to the following Math Equation:

$$r_{ij} = \begin{cases} \dfrac{t_{ij}}{t_{max}} & \text{if } c_{ij} \neq 0 \\ 0 & \text{if } c_{ij} = 0 \end{cases}$$ [Math Formula]

Wherein $r_{ij}$ represents a traffic information map element, i represents identifier information for a sender node, j represents identifier information for a receiver node, $t_{max}$ represents the maximum among the traffic volumes between pairs of nodes contained In the information transmission network, $t_{ij}$ represents a traffic volume from a sender node to a receiver node, and $c_{ij}$ represents a connection relationship between a sender node and a receiver node.

In some embodiments of the present disclosure, the generating step of the traffic information map may include correcting the traffic information map in response to request information for controlling a traffic volume by multiplying a traffic information element contained in the traffic information map by a control coefficient contained in the request information.

In some embodiments of the present disclosure, the method may further comprise simulating the information transmission network having a hierarchical structure, upon receiving the traffic information map, on a basis of the traffic information map.

In some embodiments of the present disclosure, the method may further comprise generating a traffic modeling map including traffic modeling information between sender and receiver nodes in which a traffic exist, and generating a traffic parameter map including concrete parameter information on the traffic modeling map.

Also, provided according to the present disclosure is an apparatus for modeling an information transmission network having hierarchical structure in which information transmission is conducted between pairs of nodes to which pre-defined relationships are assigned the apparatus comprising a connectivity map generating unit for generating connection relationship information for each node, on a basis of traffic information including data transmission direction information for nodes contained in the information transmission network, and a connectivity map for the nodes on a basis of the connection relationship information for each node; and a traffic map generating unit for generating a traffic information map accounting for traffic intensities between pairs of the nodes by applying inter-node traffic information to the connectivity map.

According to some embodiment of the present disclosure, traffic information map may be composed of an adjacency matrix based on a number of the nodes.

According to some embodiment of the present disclosure, the nodes contained in the information transmission network may be discriminated by respective identifier information, and the traffic map generating unit is designed to set traffic information map elements contained in the traffic information map according to the following Math Equation:

$$r_{ij} = \begin{cases} \dfrac{t_{ij}}{t_{max}} & \text{if } c_{ij} \neq 0 \\ 0 & \text{if } c_{ij} = 0 \end{cases}$$ [Math Formula]

wherein $r_{ij}$ represents a traffic information map element, i represents identifier information for a sender node, j represents identifier information for a receiver node, $t_{max}$ represents the maximum among the traffic volumes between pairs of nodes contained in the information transmission network, $t_{ij}$ represents a traffic volume from a sender node to a receiver node, and $c_{ij}$ represents a connection relationship between a sender node and a receiver node.

According to some embodiment of the present disclosure, the traffic map generating unit may be designed to correct the traffic information map in response to request information for controlling a traffic volume by multiplying a traffic information element contained in the traffic information map by a control coefficient contained in the request information.

According to some embodiment of the present disclosure, the apparatus may further comprise a simulation unit for simulating the information transmission network having a hierarchical structure, upon receiving the traffic information map, on a basis of the traffic information map.

According to some embodiment of the present disclosure, the traffic map generating unit may have an additional function to generate a traffic modeling map including traffic modeling information between sender and receiver nodes in which a traffic exist, and a traffic parameter map including concrete parameter information on the traffic modeling map.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
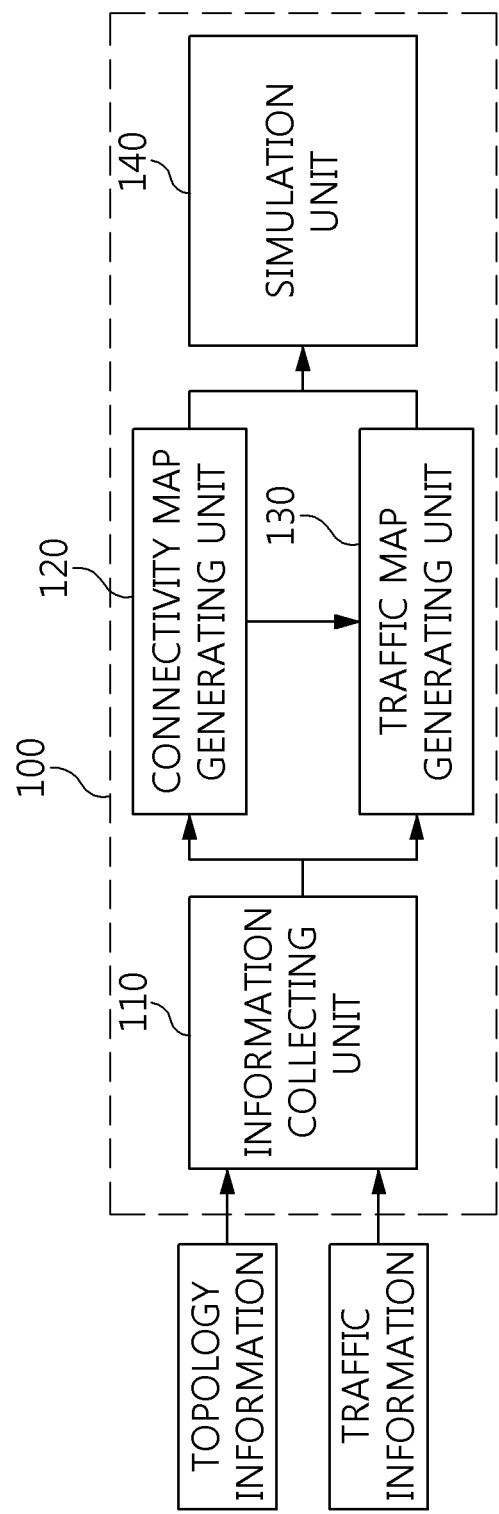
FIG. 1 is a block diagram of an apparatus for modeling an information transmission network having a hierarchical structure in accordance with an embodiment of the present disclosure.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Below, a description will be given of a method for modeling an information transmission network having a hierarchical structure, and an apparatus thereof in accordance with an embodiment of the present disclosure (hereinafter referred to as "modeling method" and "modeling apparatus", respectively). As stated above, information transmission networks, such as military tactical communication networks and SCADA, have special structures in which information is shared only between pairs of nodes to which respective pre-defined logical relationships are given. However, conventional modeling techniques and simulation tools are problematic in that the structure of the information transmission network is not taken into account. The modeling apparatus 100 according to an embodiment of the present disclosure is characterized in that a modeling and simulation process is conducted in consideration of topology information on nodes used in an information transmission network and traffic information on the nodes.

Figure 2:
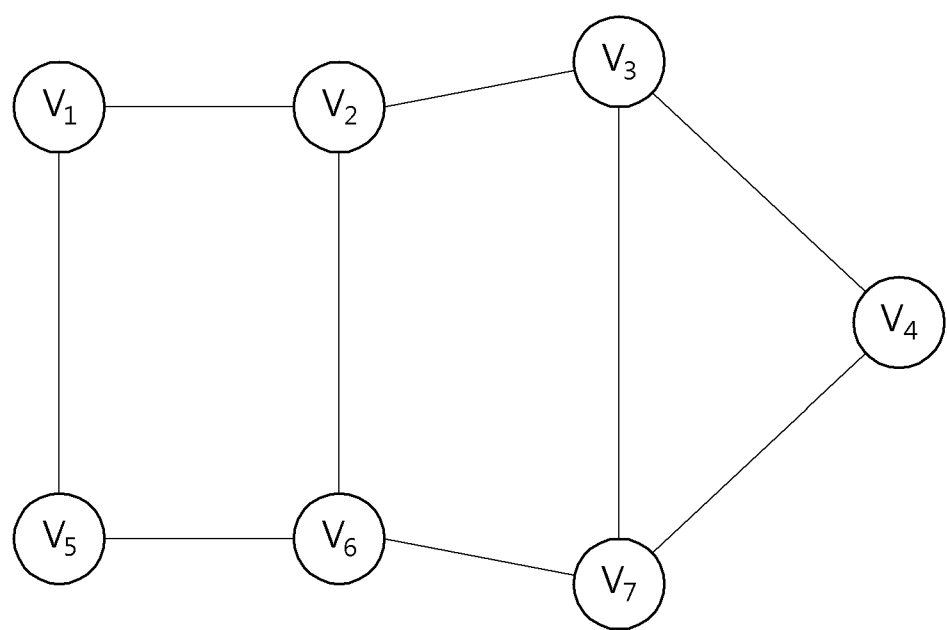
FIGS. 2 to 4 are conceptual diagrams illustrating a method for producing a connective map and a traffic information map in accordance with an embodiment of the present disclosure.

FIG. 1 is a block diagram of an apparatus 100 for modeling an information transmission network having a hierarchical structure in accordance with an embodiment of the present disclosure. FIG. 2 is an exemplary graph that illustrates a topology accounting for physical positions, and FIGS. 3 and 4 are exemplary graphs that illustrate topologies accounting for fixed information transmission features, thereby helping the understanding of the modeling apparatus 100 according to an embodiment of the present disclosure.

The modeling apparatus 100 in accordance with an embodiment of the present disclosure may include an information collecting unit 110, a connectivity map generating unit 120, a traffic map generating unit 130, and a simulation unit 140. It should be understood that the elements including, the information collecting unit 110, the connectivity map generating unit 120, the traffic map generating unit 130, and the simulation Hint 140 are classified by function in order to help the understanding of the present disclosure. That is, the modeling apparatus 100 according to an embodiment of the present disclosure may be composed of one processing unit such as a CPU, MPU, or CPU. Below, each of the elements for the modeling apparatus 100 according to an embodiment of the present invention will be described with reference to FIGS. 1 to 4.

The information collecting unit 110 functions to collect topology and traffic information on an information transmission network. Herein, the topology information may include information on the topological configuration of the information transmission network while the traffic information may include identifier information of nodes, sending direction information of data, mid traffic volume information.

Figure 3:
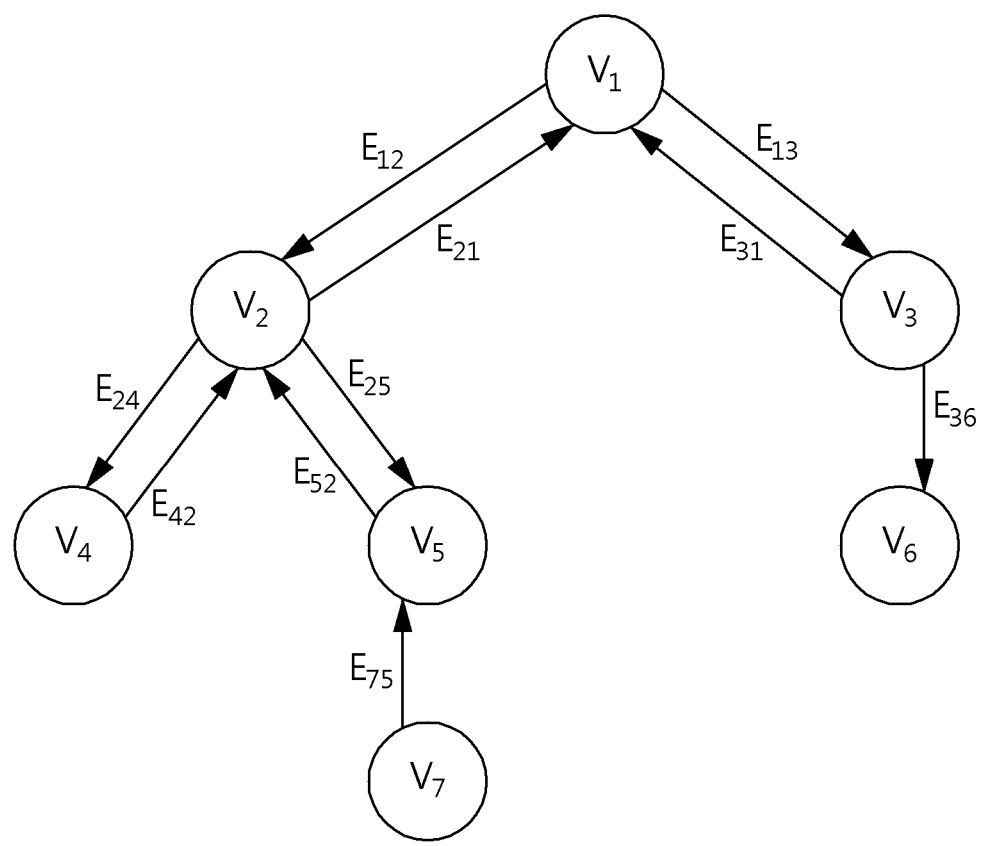
Figure 4:
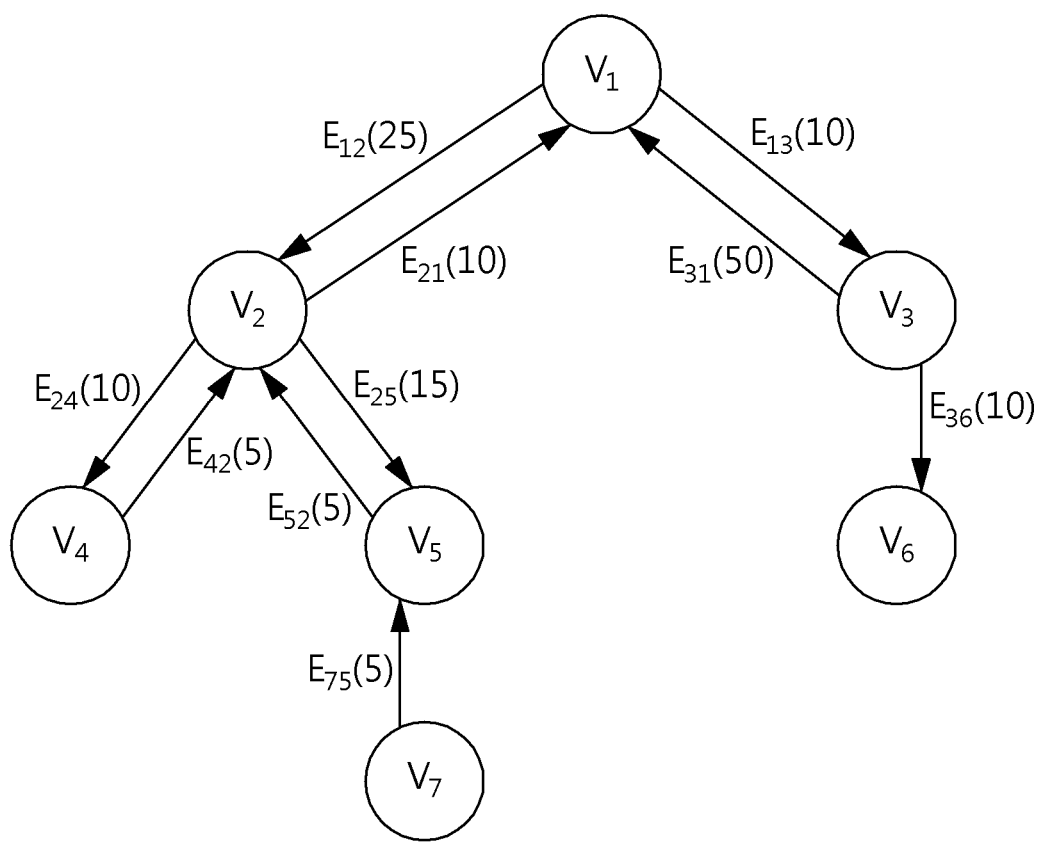

By way of example, the information transmission network may have the topological configurations shown in FIGS. 2 to 4. The graphs having such topological configurations may be expressed as the following Math Formula 1.

$$G(V,E) \quad \text{[Math Formula 1]}$$

wherein G represents a physical network in the information transmission network. In Math Formula 1 and FIGS. 2 to 4. V represents nodes contained in the network (G), and E represents a connection link between nodes in the network G. A description of the traffic information is omitted here because it will be given later.

The connectivity map generating unit 120 generates connection relationship information for each node, on the basis of traffic information between nodes contained in the information transmission network, and a connectivity map for the nodes on the basis of the connection relationship information for each node. The connectivity map generated by the connectivity map generating unit 120 is delivered to the traffic map generating unit 130 so as to generate a traffic model suitable for a hierarchical, standardized information transmission network. The generation of the connectivity map, conducted by the connectivity map generating unit 120, is as follows.

As can be seen in FIG. 3, the information transmission network may be provided with connections according to a pre-defined connection relationship. In the example of FIG. 3, a first node ($V_1$) is assumed to send data to a second node ($V_2$) and a third node ($V_3$) through respective connection links ($E_{12}$, $E_{13}$). The second node ($V_2$) is assumed to send data to the first node ($V_1$), a fourth node ($V_4$), and a fifth node ($V_5$) through respective connection links ($E_{21}$, $E_{24}$, $E_{25}$). The third node ($V_3$) is assumed to send data to the first node ($V_1$) and a sixth node ($V_6$) through respective connection links ($E_{31}$, $E_{36}$). The fourth node ($V_4$) is assumed to send data to the second node ($V_2$) through a connection link ($E_{42}$). The fifth node ($V_5$) is assumed to send data to the second node ($V_2$) through a connection link if ($E_{52}$). A seventh node ($V_7$) is assumed to send data to the fifth node ($V_5$) through a connection link ($E_{75}$).

As used herein, the term "connection link" is intended to explain the logical communication relationship of data, but does not express an actual physical connection line. That is, all pairs of nodes may communicate with each other via a single physical connection line.

With reference to the illustrative diagram of FIG. 3, directionality may be taken into account in the data transmission of the information transmission network. Concerning the seventh node ($V_7$), data transmission may be allowed from the seventh node ($V_7$) to the fifth node ($V_5$), but not from the fifth node ($V_5$) to the seventh node ($V_7$). The seventh node ($V_7$) serves as a node for performing only information transmission to an upper level node, as representatively exemplified by sensor nodes for sensing defectives in industrial control systems.

The connectivity map generating unit 120 may determine standardized information transmission that is, may generate connection relationship information, based on the transmission direction information of the data having directionality. Here, the connection relationship information may be expressed as shown in the following Math Formula 2.

$$c_{ij} = \begin{cases} 1 & \text{if traffic information exists} \\ 0 & \text{if traffic information does not exist} \end{cases} \quad \text{[Math Formula 2]}$$

wherein $c_{ij}$ is a connectivity map element contained in the connectivity map, which will be described later, that is, it represents connection relationship information, and i and j, both being identifier information of nodes contained in the information transmission network, represent identifier information of a sender node and a receiver node respectively. For example, in the case where data transmission is performed from the seventh ($V_7$) to the fifth node ($V_5$), but not from the fifth node ($V_5$) to the seventh node ($V_7$), the connectivity map element ($c_{75}$) may be 1 while the connectivity map element ($c_{57}$) may be 0. The elemental value corresponding to each of the elements set forth above is only illustrative and may be changed depending on conditions.

On the basis of the connection relationship information ($c_{ij}$) calculated according o Math Formula 2, an adjacency matrix between sender nodes and receiver nodes may he generated. The adjacency matrix may be represented by the following Math Formula 3:

$$C_G = \begin{bmatrix} c_{11} & \cdots & c_{1n} \\ \vdots & \ddots & \vdots \\ c_{n1} & \cdots & c_{nn} \end{bmatrix}_{n \times n} \quad \text{[Math Formula 3]}$$

wherein n is the number of nodes contained in the information transmission network. The adjacency matrix represented by Math Formula 3 may be defined as a connectivity map. Thus, the connectivity map generated by the connectivity map generating unit 120, as illustrated with reference to FIGS. 2 and 3 may take an adjacency matrix between sender nodes and receiver nodes, that is, a two-dimension arrangement form, in which the number of rows and columns may be defined as the number of nodes.

The connectivity map generated on the basis of the illustrative diagram of FIG. 3 may be expressed in the following Math Formula 4.

$$C_{G1} = \begin{bmatrix} 0 & 1 & 1 & 0 & 0 & 0 & 0 \\ 1 & 0 & 0 & 1 & 1 & 0 & 0 \\ 1 & 0 & 0 & 0 & 0 & 1 & 0 \\ 0 & 1 & 0 & 0 & 0 & 0 & 0 \\ 0 & 1 & 0 & 0 & 0 & 0 & 0 \\ 0 & 0 & 0 & 0 & 0 & 0 & 0 \\ 0 & 0 & 0 & 0 & 1 & 0 & 0 \end{bmatrix}_{7 \times 7} \quad \text{[Math Formula 4]}$$

Because the matrix of Math Formula 4 takes directionality into account, it is not symmetric, with diagonal elements as a pivot. Through the connectivity map of Math Formula 4, the connection relationship between senders and receivers can be understood. In addition, although it is described above that there is a connection relationship for end-to-end nodes where traffic is present, it is possible to perform communication between nodes other than pre-defined nodes for the purpose of data relay, but not for general data transmission. In this regard, the connection relationship information value slated above, that is, the value of a connectivity map element, may be determined according to user configuration. For example, when a corresponding relay process continues to occur, which reflects the continuous existence of traffic, a connectivity map clement for the corresponding node may be set to be 1. On the other hand, when the occurrence is of low frequency, the connectivity map element for the corresponding node may be set to be 0. In the present disclosure, no particular limitations are imposed on the setting since it may be changed via user configuration.

The traffic map generating unit 130 functions to generate a traffic information map that accounts for traffic intensity by applying inter-node traffic information to the connectivity map generated by the connectivity map generating unit 120. As used herein, the term "traffic intensity" does not refer to the absolute quantity of traffic, but to the ratio of end-to-end traffic compared to the maximum traffic volumes existing in the information transmission network. The traffic map generating unit 130 according to an embodiment of the present disclosure, as stated above, generates a 2-D arrangement on the basis of the traffic information, wherein values contained in the arrangement are input traffic ratios, rather than as traffic volumes. This feature, as will be described later, may allow for collectively increasing or decreasing respective values corresponding to elements when controlling traffic values for simulation. Of course, each of the elements contained in the traffic information map may be given an inter-node traffic volume, but a ratio value may be preferably applied for the collective treatment stated above.

For this, the traffic map generating unit 130 can generate traffic information map elements according to the following Math Formula 5:

$$r_{ij} = \begin{cases} \dfrac{t_{ij}}{t_{max}} & \text{if } c_{ij} \neq 0 \\ 0 & \text{if } c_{ij} = 0 \end{cases} \quad \text{[Math Formula 5]}$$

wherein $r_{ij}$ represents a traffic information map clement, i represents identifier information for a sender node, j represents identifier information for a receiver node, $t_{max}$ represents the maximum among the traffic volumes between pairs of nodes contained in the information transmission network, $t_{ij}$ represents a traffic volume from a sender node to a receiver node, and $c_{ij}$ represents a connection relationship between a sender node and a receiver node. Thus, the traffic information map element ($r_{ij}$) can be determined as a ratio of a traffic volume from a sender node (i) to a receiver node (j) to the maximum traffic volume ($t_{max}$) among all inter-node traffic volumes. In a particular embodiment, the traffic information map element ($r_{ij}$) can also be used to generate an adjacency matrix between sender nodes and receiver nodes. The adjacency matrix generated may be expressed as in the following Math Formula 6:

$$R_G = \begin{bmatrix} r_{11} & \cdots & r_{1n} \\ \vdots & \ddots & \vdots \\ r_{n1} & \cdots & r_{nn} \end{bmatrix}_{n \times n} \quad \text{[Math Formula 6]}$$

Here, the adjacency matrix may be defined as a traffic information map. In other words, the traffic information map is an adjacency matrix calculated as the ratio of information transmission-based end-to-end traffic to a maximum traffic volume in the informaton transmission network.

For example, suppose that data transmission is performed in an information transmission network as shown in FIG. 4. That is, suppose that a traffic volume of 25 is given to the data transmitted from the first node ($V_1$) to the second node ($V_2$) and a traffic volume of 10 is given to the data transmitted from the first node ($V_1$) to the third node ($V_3$). Also suppose that traffic volumes of 10, 10, and 15 are given to the data Transmuted from the second node ($V_2$) to the first node ($V_1$), from the second node ($V_2$) to the fourth node ($V_4$), and from the second ($V_2$) to the fifth node ($V_5$), respectively. An additional description of traffic volumes caused by data transmission in other nodes is omitted because they are shown in the diagram.

Referring to FIG. 4, a traffic volume of 50 is defined for the data transmission from the third node ($V_3$) to the first node ($V_1$), and is maximal in the information transmission network. The traffic volume from the first node ($V_1$) to the second node ($V_2$) is given 25, which is half the maximum traffic volume 50. Calculation according to Math Formula 5 gives the traffic information map element ($r_{12}$) 0.5. Likewise. the traffic information map element ($r_{31}$) is calculated to be 1.

When this calculation is applied to the diagram of FIG. 4, the traffic information map can be modeled as shown in the following Math Formula 7:

$$R_{G1} = \begin{bmatrix} 0 & 0.5 & 0.2 & 0 & 0 & 0 & 0 \\ 0.2 & 0 & 0 & 0.2 & 0.3 & 0 & 0 \\ 1 & 0 & 0 & 0 & 0 & 0.2 & 0 \\ 0 & 0.1 & 0 & 0 & 0 & 0 & 0 \\ 0 & 0.1 & 0 & 0 & 0 & 0 & 0 \\ 0 & 0 & 0 & 0 & 0 & 0 & 0 \\ 0 & 0 & 0 & 0 & 0.1 & 0 & 0 \end{bmatrix}_{7 \times 7}$$ [Math Formula 7]

The matrix shown in Math Formula 7 has a two-dimensional 7×7 arrangement, as an example calculated on the basis of the information transmission network of FIG. 4. That is, the matrix of Math Formula 7 is based on the assumption that the information transmission network has 7 nodes. Hence, the size of the arrangement may vary with the number of nodes. In addition, values belonging to traffic information map elements may vary with traffic volumes of the end-to-end nodes.

After receiving the traffic information map generated by the traffic map generating unit 130, the simulation unit 140 can perform simulation on the basis of the traffic information map. Of course, the simulation unit 140 can perform simulation based on the connectivity map generated by the connectivity map generating unit 120.

As described above, the modeling apparatus 100 according to an embodiment of the present disclosure can define a connection relationship between pairs or nodes, to which logical connection links are given, through a connectivity map, in consideration of the properties of a hierarchical, standardized information transmission network, and can generate a traffic information map (e.g. a traffic information models in which the connection relationship between pairs of nodes of the information transmission network is taken into account on the basis of the connectivity map. Accordingly, the modeling apparatus 100 according to an embodiment of the present disclosure takes the situation of special, hierarchical networks, such as military tactical communication networks and SCADA, into consideration, unlike conventional modeling and simulation techniques, and thus is advantageously able to achieve a desired modeling and simulation level.

The connectivity map and the traffic information map respectively generated by the connectivity map generating unit 120 and the traffic map generating unit 130, as described above, exhibit separate, independent relationships with the simulation unit 140. In other words, when the information transmission system is modulated, the modeling apparatus 100 according to an embodiment of the present disclosure is designed to perform simulation in such a manner that only the connectivity map and the information map are changed, without a direct influence on the network model configured using a modeling and simulation tool, thereby reducing the number of modeling steps and simplifying a simulation procedure. Therefore, the modeling apparatus 100 can minimize the waste of time and resources.

In this regard, when receiving request information for controlling a traffic volume according to a user's request, the traffic map generating unit 130 can correct the traffic information map by multiplying a traffic information element contained in the traffic information map by a control coefficient contained in the request information. That is, in order to increase or decrease traffic volumes of the traffic information map, the traffic map generating unit 130 can collectively vary the traffic volumes by multiplying the traffic information map by a predetermined control coefficient.

In addition, there are various traffic-producing models for use in simulating the information transmission network. Representative among the models are a CBR (Constant bit rate) model, an on-off source model, an MMPP (Makrov Modulated Poisson Process) model, and a Poisson traffic model. Accordingly, various traffic-producing models that can additionally be defined may be taken into consideration.

In this regard, since information on the traffic-producing models is restrictively expressed only by the traffic information map, the traffic map generating unit 130 may further generate a traffic modeling map, including the traffic model information, and a traffic parameter map, including parameter information on the traffic modeling map.

Here, although similar to a relationship map in expressing a connection relationship between pairs of nodes, the traffic modeling map can designate an index to determine the model through which end-to-end nodes produce traffic, unlike CMAP, which expresses a model in terms of 0 and 1. The traffic modeling map elements contained in the traffic modeling map may be expressed according to the following Math Formula 8:

$$m_{ij} = \begin{cases} 0 & \text{if } t_{ij} \text{ belongs to a } CBR \text{ model} \\ 1 & \text{if } t_{ij} \text{ belongs to an On-Off model} \\ 2 & \text{if } t_{ij} \text{ belongs to an } MMPP \text{ model} \\ 3 & \text{if } t_{ij} \text{ belongs to a Poisson traffic model} \\ \vdots & \vdots \\ -1 & \text{otherwise (i.e. not connected)} \end{cases}$$ [Math Formula 8]

wherein $m_{ij}$ represents a traffic modeling map element for the traffic modeling map elements ($m_{ij}$), indexes of traffic-producing models that will be applied between nodes may be stored. In this embodiment, suppose that the traffic modeling map element ($m_{ij}$) is 0 for a CBR (constant bit rate) model, 1 for an on-off source model, 2 for an MMPP model, 3 for a Poisson traffic model and −1 for no logical connection relationship. Although the traffic-producing models for the traffic modeling map elements are described as a CBR model, an On-Off source model, an MMPP model and a Poisson traffic model, it should be understood that various models may be included. In addition, various values may be applied to the traffic modeling map elements via user configuration.

Based on Math Formula 8, an adjacency matrix may be produced. The adjacency matrix may be expressed according to the following Math Formula 9.

$$M_G = \begin{bmatrix} m_{11} & \cdots & m_{1n} \\ \vdots & \ddots & \vdots \\ m_{n1} & \cdots & m_{nn} \end{bmatrix}_{n \times n}$$ [Math Formula 9]

wherein MG represents a traffic modeling map. As described above, the traffic modeling map (MG) may be an adjacency matrix of the indexes produced on the basis of the connection relationship of the connectivity map and the traffic-producing model to which the relationship is applied.

For the aforementioned traffic-producing model, an additional parameter may exist according to the properties of each (traffic) producing model. For example, an On-Off source model may be endowed with parameters, such as average On time, average Off time, traffic volumes during On time, etc.

Therefore, the traffic map generating unit 130 may further generate a traffic parameter map for discriminating the information of the parameters caused according to properties of the traffic-producing models. The traffic parameter map is subject to the traffic modeling map because it is generated according to the relationship with the traffic-producing model.

The traffic modeling map and the traffic parameter map may be used in simulating the information transmission network with various traffic-producing models. When one traffic-producing model exists, a corresponding traffic-producing model can be used as a basic value in simulating the information transmission network. Accordingly, it is not absolutely necessary to generate the traffic modeling map and the traffic parameter map. That is, when a plurality of traffic-producing models exist, the traffic map generating unit 130 may preferably generate a traffic modeling map and a traffic parameter map. On the other hand, when one traffic-producing model is designated as a default, the generation of a traffic modeling map and a traffic parameter map is an option that can be changed via user configuration.

Figure 5:
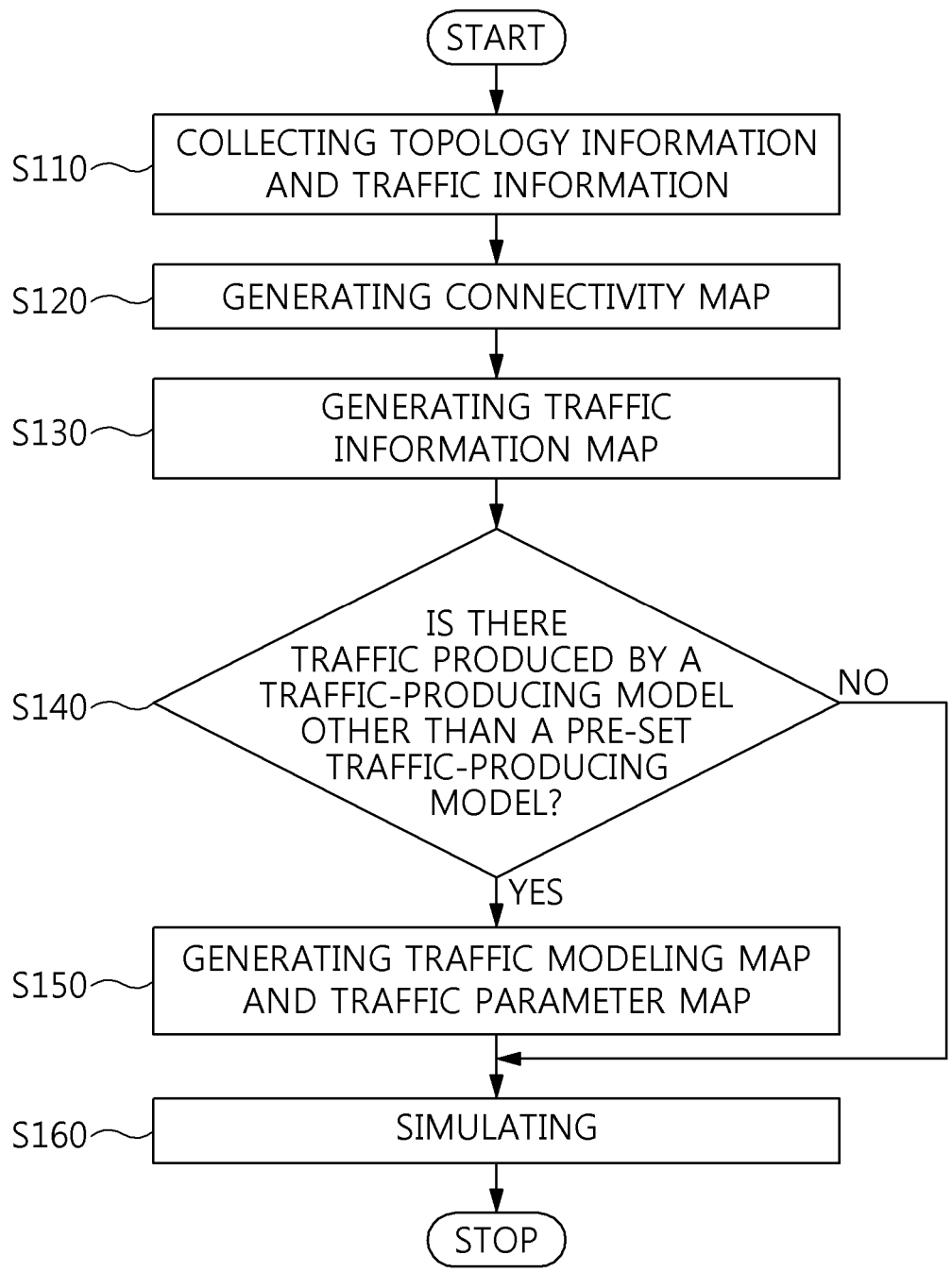
FIG. 5 is a flow chart of a method for modeling an information transmission network having a hierarchical structure in accordance with an embodiment of the present disclosure.

FIG. 5 is a flow chart of a method for modeling an information transmission network having a hierarchical structure in accordance with an embodiment of the present disclosure. With reference to FIG. 5, the method for modeling an information transmission network having a hierarchical structure in accordance with an embodiment of the present disclosure will be described, below. In the following description, omission is made of the parts that are already described above.

First, the information collecting unit performs a step of collecting topology information and traffic information for the information transmission network (S110). As described above, the topology information may include information on the topological configuration of the information transmission network while the traffic information may include identifier information of nodes, sending direction intonation of data, and traffic volume information. A concrete description of individual information is omitted because it is given above in conjunction with FIG. 1.

Then, the connectivity map generating unit generates connection relationship information, based on the data transmission direction information for each of the nodes used in the information transmission network, and a connectivity map, based on the connection relationship Information (S120).

In the information transmission network having a hierarchical structure that is, in the hierarchical, standardized information transmission network, as described above, data may be transmitted between pre-defined pairs of nodes. In addition, data transmission is not always implemented through two-way communication, but may be defined as one-way communication. Hence, step S120 is set to generate end-to-end information of nodes (e.g., connectivity map elements), based on the transmission direction information of data in consideration of properties of the information transmission network and to generate a connectivity map, based on the connectivity relationship information. As stated above, the connectivity map may be formed into an adjacency matrix based on the number of nodes and the connectivity map elements. A description of the connectivity map is omitted because it is given in detail above in conjunction with FIGS. 1 to 3.

Thereafter, the traffic map generating unit performs a step S130 in which traffic information between pairs of nodes is applied to the connectivity map generated in step S120 to generate a traffic information map accounting for traffic intensities between pairs of nodes. Here, because being based on the connectivity map, the traffic information map can be composed of an adjacency matrix based on the number of nodes, like the connectivity map.

As stated above, the traffic information map generated in step S130 can be formed into an adjacency matrix that reflects the connectivity map and the traffic information. The generation of the traffic information map in step S130 is not further described because a concrete description thereof is given above in conjunction with FIGS. 1 to 4.

End-to-end traffic volumes, or ratios of end-to-end traffic volumes to a maximum volume may be input into the traffic information map elements contained in the traffic information map. Either of the attributes may be input into the traffic information map elements. and preferable are ratios of end-to-end traffic volumes to a maximum volume. This is, as stated above, because when traffic values are controlled for simulation, respective values for all elements can be increased or decreased collectively.

Accordingly, the step of generating a traffic information map (S130) may comprise correcting the traffic information map upon receiving traffic volume-controlling request information by multiplying the traffic information map elements contained in the traffic information map by a control coefficient contained in the traffic volume-controlling request information.

Afterward, a step of determining whether traffic is produced by a traffic-producing model other than a pre-set traffic-producing model is conducted (S140). As described above, information on traffic volumes between pairs of nodes, contained in the traffic information, may account for the traffic produced by one traffic producing model, or a plurality of traffic producing models. For a plurality of traffic producing models, various models including a CBR (Constant bit rate) model, an On-off source model, an MMPP (Marlon Modulated Poisson Process) model, and a Poisson traffic model may be given. They produce traffic in respective manner, and have respective parameters.

Thus, the modeling method according to an embodiment of the present disclosure makes a decision in step S140 and transmits the next control to step S150 when a plurality traffic producing models are used, of to step 160 when otherwise.

Step S150 is set to generate a traffic modeling map including traffic modeling information between sender and receiver nodes in which a traffic exist, and a traffic parameter map including concrete parameter information on the traffic modeling map. Here, a concrete description of the traffic modeling map and the traffic parameter map is omitted because it is given in conjunction with FIG. 1.

In addition, even when it is determined in step S140 that the traffic production is achieved only by a pre-set traffic generating model, the next control may be transmitted to step S150 via user configuration to generate a traffic modeling and a traffic parameter map.

Then, the simulation unit simulates the information transmission network having a hierarchical structure, on the basis of the traffic information map (S160).

Generating a connectivity map and a traffic information map based on traffic information, as described hitherto, the method and the apparatus according to the preset disclosure can allow for modeling an information transmission network having a hierarchical structure while fully reflecting the hierarchical and standardized properties of the network.

The modeling method and apparatus of the present disclosure can express a standardized information transmission system in a matrix form, whereby a ratio of a traffic volume for each node to a maximum traffic volume as well as a connectivity map and a clear traffic volume, both capable of explaining a change in the information transmission system, can be applied to generate a traffic information map reflecting various and variable traffic generation conditions.

Also, designed to use the connectivity map and the traffic information map independently from a simulation tool, the modeling method and apparatus of the present disclosure can solve the problems of conventional modeling and simulation methods, which occur in conjunction with the subordination of simulation.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for modeling an information transmission network having a hierarchical structure in which information transmission is conducted between pairs of nodes to which pre-defined relationships are assigned, the method being implemented by a processor executing instructions stored in a memory and comprising:
   generating connection relationship information for each of the nodes, on a basis of traffic information including data transmission direction information for the nodes contained in the information transmission network;
   generating a connectivity map for the nodes on a basis of the connection relationship information for each of the nodes; and
   generating a traffic information map accounting for traffic intensities between pairs of the nodes by applying inter-node traffic information to the connectivity map,
   wherein the connectivity map expresses the connection relationship information in a matrix form to reflect a change in the connection relationship information, and
   wherein the traffic information map reflects various and variable traffic generation conditions by applying a traffic volume for each node and a ratio of the traffic volume for each node to a maximum traffic volume to the connectivity map.

2. The method of claim 1, wherein the matrix form is composed of an adjacency matrix based on a number of the nodes.

3. The method of claim 2,
   wherein the nodes contained in the information transmission network are discriminated by respective identifier information, and
   wherein the generating of the traffic information map includes setting traffic information map elements contained in the traffic information map according to the following equation:

$$r_{ij} = \begin{cases} \dfrac{t_{ij}}{t_{max}} & \text{if } c_{ij} \neq 0 \\ 0 & \text{if } c_{ij} = 0 \end{cases}$$

wherein $r_{ij}$ represents a traffic information map element, i represents identifier information for a sender node, j represents identifier information for a receiver node, $t_{max}$ represents the maximum among the traffic volumes between pairs of nodes contained in the information transmission network, $t_{ij}$ represents a traffic volume from a sender node to a receiver node, and $c_{ij}$ represents a connection relationship between a sender node and a receiver node.

4. The method of claim 1, wherein the generating of the traffic information map includes correcting the traffic information map in response to request information for controlling a traffic volume by multiplying a traffic information element contained in the traffic information map by a control coefficient contained in the request information.

5. The method of claim 1, further comprising simulating the information transmission network having the hierarchical structure on a basis of the traffic information map, upon receiving the traffic information map.

6. The method of claim 1, further comprising:
   generating a traffic modeling map including traffic modeling information between sender and receiver nodes on which a traffic exists; and
   generating a traffic parameter map including concrete parameter information on the traffic modeling map.

7. An apparatus for modeling an information transmission network having a hierarchical structure in which information transmission is conducted between pairs of nodes to which pre-defined relationships are assigned, the apparatus comprising:
   a non-transitory computer-readable medium which has stored thereon computer-executable instructions to cause a processor to implement following functions, the functions comprising:
   a connectivity map generating unit for generating connection relationship information for each of the nodes, on a basis of traffic information including data transmission direction information for the nodes contained in the information transmission network, and a connectivity map for the nodes on a basis of the connection relationship information for each of the nodes; and
   a traffic map generating unit for generating a traffic information map accounting for traffic intensities between pairs of the nodes by applying inter-node traffic information to the connectivity map,
   wherein the connectivity map expresses the connection relationship information in a matrix form to reflect a change in the connection relationship information, and
   wherein the traffic information map reflects various and variable traffic generation conditions by applying a traffic volume for each node and a ratio of the traffic volume for each node to a maximum traffic volume to the connectivity map.

8. The apparatus of claim 7, wherein the matrix form is composed of an adjacency matrix based on a number of the nodes.

9. The apparatus of claim 8,
wherein the nodes contained in the information transmission network are discriminated by respective identifier information, and
wherein the traffic map generating unit is designed to set traffic information map elements contained in the traffic information map according to the following equation:

$$r_{ij} = \begin{cases} \dfrac{t_{ij}}{t_{max}} & \text{if } c_{ij} \neq 0 \\ 0 & \text{if } c_{ij} = 0 \end{cases}$$

wherein $r_{ij}$ represents a traffic information map element, i represents, identifier information for a sender node, j represents identifier information for a receiver node, $t_{max}$ represents the maximum among the traffic volumes between pairs of nodes contained in the information transmission network, $t_{ij}$ represents a traffic volume from a sender node to a receiver node, and $c_{ij}$ represents a connection relationship between a sender node, and a receiver node.

10. The apparatus of claim 7, wherein the traffic map generating unit is designed to correct the traffic information map in response to request information for controlling a traffic volume by multiplying a traffic information element contained in the traffic information map by a control coefficient contained in the request information.

11. The apparatus of claim 7, further comprising a simulation unit for simulating the information transmission network having the hierarchical structure on a basis of the traffic information map, upon receiving the traffic information map.

12. The apparatus of claim 7, wherein the traffic map generating unit has an additional function to generate a traffic modeling map including traffic modeling information between sender and receiver nodes on which a traffic exists, and a traffic parameter map including concrete parameter information on the traffic modeling map.

\* \* \* \* \*